(12) United States Patent
Lecuyer et al.

(10) Patent No.: US 11,578,607 B2
(45) Date of Patent: Feb. 14, 2023

(54) AIRFOIL HAVING A SPLINE FILLET

(71) Applicant: PRATT & WHITNEY CANADA CORP., Longueuil (CA)

(72) Inventors: Daniel Lecuyer, St-Bruno-de-Montarville (CA); Michael Paolucci, Kirkland (CA); Francis Gemme, Saint-Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/122,517

(22) Filed: Dec. 15, 2020

(65) Prior Publication Data

US 2022/0186622 A1 Jun. 16, 2022

(51) Int. Cl.
*F01D 5/14* (2006.01)
*F01D 9/02* (2006.01)

(52) U.S. Cl.
CPC .............. *F01D 9/02* (2013.01); *F01D 5/147* (2013.01); *F01D 5/141* (2013.01); *F01D 5/143* (2013.01); *F05D 2220/32* (2013.01); *F05D 2230/00* (2013.01); *F05D 2240/12* (2013.01); *F05D 2240/24* (2013.01); *F05D 2240/80* (2013.01); *F05D 2250/71* (2013.01)

(58) Field of Classification Search
CPC ................................................. F01D 5/14–147
See application file for complete search history.

(56) References Cited

U.S. PATENT DOCUMENTS

| | | | | |
|---|---|---|---|---|
| 1,772,876 A | * | 8/1930 | Parsons | B23P 15/02 416/223 R |
| 3,890,062 A | * | 6/1975 | Hendrix | F04D 29/324 416/223 R |
| 5,435,694 A | * | 7/1995 | Kray | F01D 5/3007 416/239 |
| 5,439,402 A | * | 8/1995 | Dai | B63H 11/02 440/47 |
| 5,731,816 A | * | 3/1998 | Stewart | G06T 17/20 345/419 |
| 5,984,314 A | * | 11/1999 | Peters | F01D 11/02 277/412 |
| 6,082,738 A | * | 7/2000 | Peters | F01D 11/02 277/412 |

(Continued)

*Primary Examiner* — Richard A Edgar
*Assistant Examiner* — Behnoush Haghighian
(74) *Attorney, Agent, or Firm* — Norton Rose Fulbright Canada LLP

(57) ABSTRACT

An airfoil for a gas turbine engine, which has an airfoil body extending in a spanwise direction and in a chordwise direction, a platform located at an inner end and/or an outer end of the airfoil body, and a fillet at a junction between the airfoil body and the platform. The fillet has a radius distribution at a given chordwise location, the radius distribution varying from the platform to the airfoil body in the spanwise direction. The radius distribution defines a local minimum, the radius of the fillet at the given chordwise location increasing from the local minimum along the spanwise direction toward both of the airfoil and the platform. A local maximum of the radius distribution is offset from the local minimum along the spanwise direction, the radius decreasing from the local maximum along the spanwise direction toward both of the airfoil and the platform.

20 Claims, 10 Drawing Sheets

(56) References Cited

U.S. PATENT DOCUMENTS

| | | | | |
|---|---|---|---|---|
| 6,106,188 | A * | 8/2000 | Krautzig | F01D 5/3007 403/375 |
| 6,181,978 | B1 * | 1/2001 | Hinds | G06T 17/20 700/98 |
| 6,190,128 | B1 * | 2/2001 | Fukuno | F01D 5/141 416/239 |
| 6,478,539 | B1 * | 11/2002 | Trutschel | F01D 5/143 415/223 |
| 6,481,967 | B2 * | 11/2002 | Tomita | F01D 5/186 415/115 |
| 6,490,791 | B1 * | 12/2002 | Surace | B23P 6/045 29/402.06 |
| 6,851,924 | B2 * | 2/2005 | Mazzola | F01D 5/145 415/115 |
| 6,857,853 | B1 | 2/2005 | Tomberg et al. | |
| 6,969,232 | B2 * | 11/2005 | Zess | F04D 29/681 416/193 A |
| 7,220,100 | B2 * | 5/2007 | Lee | F01D 5/143 416/193 A |
| 7,371,046 | B2 * | 5/2008 | Lee | F01D 5/143 416/193 A |
| 7,625,181 | B2 * | 12/2009 | Matsuda | F01D 5/143 416/193 A |
| 7,963,742 | B2 * | 6/2011 | Clouse | F01D 5/147 415/209.3 |
| 8,047,787 | B1 * | 11/2011 | Liang | F01D 5/187 416/97 R |
| 8,100,655 | B2 * | 1/2012 | Stone | B23C 5/1009 416/193 A |
| 8,206,095 | B2 * | 6/2012 | Parker | F01D 5/14 416/193 A |
| 8,287,241 | B2 * | 10/2012 | Strohl | F01D 5/141 416/190 |
| 8,721,287 | B2 * | 5/2014 | Billotey | F04D 29/284 415/206 |
| 9,017,030 | B2 * | 4/2015 | Beeck | F01D 5/141 416/193 A |
| 9,581,027 | B2 * | 2/2017 | Romanowski | F01D 5/143 |
| 9,630,277 | B2 * | 4/2017 | Lee | B23P 6/007 |
| 9,631,504 | B2 * | 4/2017 | Bentley | F04D 29/563 |
| 9,920,633 | B2 * | 3/2018 | Bergman | F01D 9/041 |
| 9,932,834 | B2 * | 4/2018 | Hough | F01D 5/3007 |
| 9,951,787 | B2 * | 4/2018 | De Santis | F04D 29/284 |
| 9,982,548 | B2 * | 5/2018 | Ols | F01D 5/02 |
| 10,301,944 | B2 * | 5/2019 | Buchholz | F01D 5/14 |
| 10,309,241 | B2 * | 6/2019 | Bailey | F04D 29/544 |
| 10,352,180 | B2 * | 7/2019 | Stein | F01D 9/041 |
| 10,408,227 | B2 * | 9/2019 | Bailey | F02K 3/06 |
| 10,458,257 | B2 * | 10/2019 | Nucci | F01D 5/141 |
| 10,502,230 | B2 * | 12/2019 | Anderson | F01D 5/143 |
| 10,844,726 | B2 * | 11/2020 | Horn | B32B 7/00 |
| 10,968,747 | B2 * | 4/2021 | Gray | F01D 5/02 |
| 11,230,934 | B2 * | 1/2022 | Hamabe | F01D 9/02 |
| 2002/0194733 | A1 | 12/2002 | Surace | B23P 6/045 29/889.1 |
| 2004/0062636 | A1 * | 4/2004 | Mazzola | F01D 5/145 415/115 |
| 2006/0275112 | A1 * | 12/2006 | Lee | F01D 5/143 415/191 |
| 2007/0081898 | A1 * | 4/2007 | Matsuda | F01D 9/041 416/193 A |
| 2009/0246032 | A1 * | 10/2009 | Stone | B23C 3/18 409/125 |
| 2010/0129228 | A1 * | 5/2010 | Strohl | F01D 5/141 416/239 |
| 2010/0284815 | A1 * | 11/2010 | Parker | F01D 5/14 29/889.7 |
| 2011/0064583 | A1 * | 3/2011 | Billotey | F04D 29/284 416/234 |
| 2013/0101409 | A1 * | 4/2013 | Beeck | F01D 5/141 415/208.2 |
| 2014/0363302 | A1 * | 12/2014 | Romanowski | F01D 5/14 416/223 R |
| 2015/0125302 | A1 * | 5/2015 | Roberto | F04D 29/284 416/183 |
| 2015/0285085 | A1 * | 10/2015 | Bentley | F04D 29/563 415/208.1 |
| 2016/0003048 | A1 * | 1/2016 | Gray | F02C 3/04 60/805 |
| 2016/0032727 | A1 * | 2/2016 | Hough | F01D 5/141 416/239 |
| 2016/0123166 | A1 * | 5/2016 | Ols | F01D 9/041 415/210.1 |
| 2016/0265551 | A1 * | 9/2016 | Bailey | F01D 5/143 |
| 2017/0009587 | A1 * | 1/2017 | Szymanski | G06F 30/00 |
| 2019/0024673 | A1 * | 1/2019 | Anderson | F02C 3/04 |
| 2019/0120061 | A1 * | 4/2019 | Horn | B32B 7/00 |
| 2019/0178094 | A1 * | 6/2019 | Schutte | F01D 5/34 |
| 2019/0338659 | A1 * | 11/2019 | Hamabe | F01D 5/14 |
| 2020/0182061 | A1 * | 6/2020 | Takeda | F01D 5/14 |
| 2020/0240292 | A1 * | 7/2020 | Strömberg | F01D 5/143 |

* cited by examiner

FIG_5

AIRFOIL HAVING A SPLINE FILLET

TECHNICAL FIELD

The disclosure relates generally to aircraft engines, such as gas turbine engines, and more particularly to airfoils, such as blades and vanes used in turbine and/or compressor sections of such engines.

BACKGROUND

In a gas turbine engine, some airfoils such as rotor blades and stator vanes include an airfoil body that is secured to a platform and/or a shroud. A fillet is present between the airfoil body and the platform or shroud, to cater to constraint concentrations that might otherwise occur at a junction between the airfoil body and a platform. Typically, the geometries of such fillets are circular, elliptical, or conical. Improvements of these fillet geometries is sought in order to cater to local stress concentrations.

SUMMARY

In one aspect, there is provided an airfoil for a gas turbine engine, comprising: an airfoil body extending in a spanwise direction from an inner end to an outer end and extending in a chordwise direction from a leading edge to a trailing edge, the airfoil body having a pressure side and an opposed suction side; a platform located at the inner end and/or the outer end of the airfoil body, the platform extending transversally to the airfoil body; and a fillet at a junction between the airfoil body and the platform, the fillet having a radius distribution at a given chordwise location, the radius distribution of the fillet varying from the platform to the airfoil body in the spanwise direction, the radius distribution defining a local minimum, the radius of the fillet at the given chordwise location increasing from the local minimum along the spanwise direction toward both of the airfoil and the platform, and a local maximum offset from the local minimum along the spanwise direction, the radius decreasing from the local maximum along the spanwise direction toward both of the airfoil and the platform.

In some embodiments, the fillet has fillet sections extending from a platform end at the platform to an airfoil end at the airfoil body, at least one of the fillet section having an inflection point at which a radius of the fillet is infinite.

In some embodiments, the at least one of the fillet section is located on the suction side of the airfoil body.

In some embodiments, the fillet has fillet sections extending from a platform end at the platform to an airfoil end at the airfoil body, each of the fillet sections having a length extending from the platform end to the airfoil end along the fillet, the length of the fillet sections varying around the airfoil body.

In some embodiments, the length is maximal on the suction side of the airfoil body.

In some embodiments, where the length of the fillet is maximal, a ratio of a first distance along the spanwise direction between the airfoil end and the platform to a second distance along a direction transverse to the chordwise direction between the airfoil body and the platform end is greater than 1.

In some embodiments, a second local minimum is provided, the radius of the fillet at the given chordwise location increasing from the second local minimum along the spanwise direction toward both of the airfoil and the platform, the local maximum located between the local minimum and the second local minimum.

In some embodiments, the local minimum is located closer to the platform than the local maximum.

In some embodiments, the local maximum is located closer to the platform than the local minimum.

In some embodiments, the given chordwise location is located on the suction side of the airfoil body.

In some embodiments, the radius distribution has a start fillet radius at the platform and an end fillet radius at the airfoil body, a difference between the start fillet radius and one of the local minimum and the local maximum different than a difference between the end fillet radius and the other of the local minimum and the local maximum.

In some embodiments, the airfoil is a turbine blade.

In some embodiments, a shroud is located at the outer end of the airfoil body, an outer fillet at a junction between the airfoil body and the shroud, an outer radius distribution of a fillet section of the outer fillet defining at least two local extrema located on the fillet and offset from both of the airfoil and the platform.

In another aspect, there is provided an airfoil for a gas turbine engine, comprising: an airfoil body extending in a spanwise direction from a first end to a second end and extending in a chordwise direction from a leading edge to a trailing edge, the airfoil body having a pressure side and an opposed suction side; a wall at the first end of the airfoil body, the wall extending transversally to the airfoil body; and a fillet at a junction between the airfoil body and the wall, at a given chordwise location, the fillet defining a convex portion and a concave portion.

In some embodiments, the concave portion is located closer to the platform than the convex portion.

In some embodiments, the fillet defines an inflection point at an intersection between the concave portion and the convex portion.

In some embodiments, the fillet extends away from the airfoil body from the inflection point toward the platform.

In some embodiments, the convex portion and the concave portion are defined on one of the suction side and the pressure side of the airfoil body, the fillet extending toward the other of the suction side and the pressure side of the airfoil body from the inflection point to define an undercut in the airfoil body.

In some embodiments, the fillet has fillet sections extending from a platform end at the platform to an airfoil end at the airfoil body, each of the fillet sections having a length extending from the platform end to the airfoil end along the fillet, the length of the fillet sections varying around the airfoil body.

In yet another aspect, there is provided a method of manufacturing a blade for a gas turbine engine, the method comprising: providing an airfoil body with at least one end thereof joined to a platform; and forming a spline fillet between said at least one end of the airfoil body and the platform, the spline fillet having a radius distribution at a determined chordwise location, the radius distribution including a first radius of the fillet and a second radius of the fillet, the first radius being a local minimum radius, the second radius being a local maximum radius, a radius of the fillet increasing from the local minimum along a spanwise direction toward both of the airfoil and the platform, the radius decreasing from the local maximum along the spanwise direction toward both of the airfoil and the platform.

BRIEF DESCRIPTION OF THE DRAWINGS

Reference is now made to the accompanying figures in which.

DETAILED DESCRIPTION

In at least some of the figures that follow, some elements appear more than once (e.g. there may be two, three, etc. of a given part in a given embodiment). Accordingly, only a first instance of each given element may be labeled, to maintain clarity of the figures.

Figure 1:
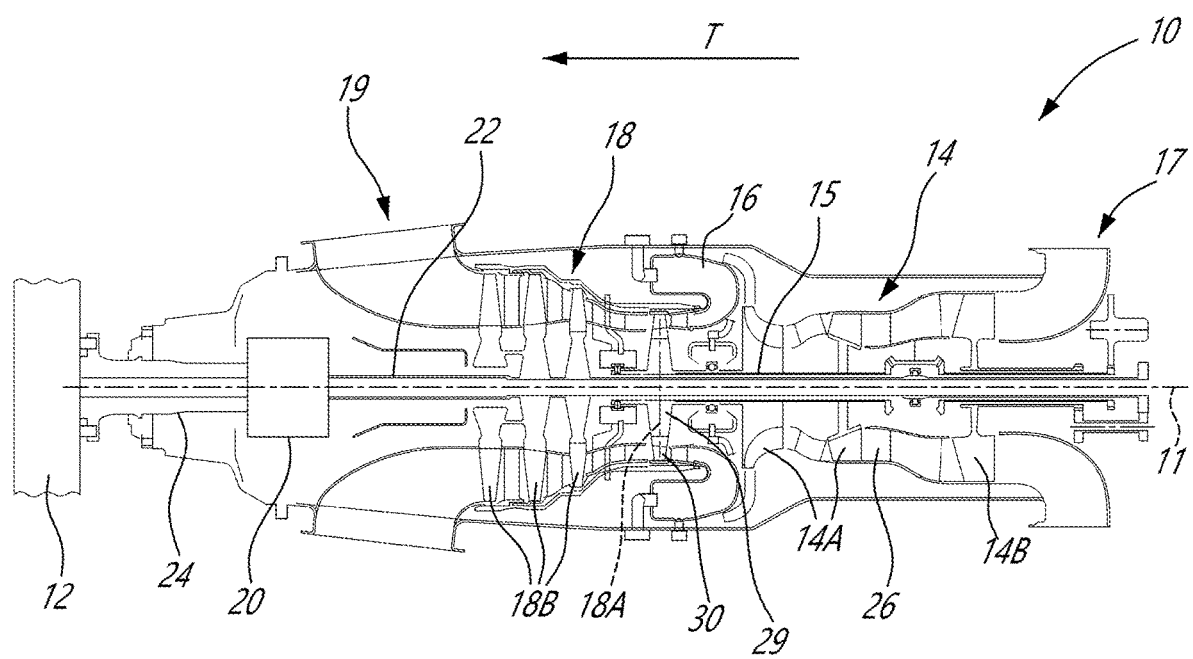
FIG. 1 is a schematic cross sectional view of a gas turbine engine.

FIG. 1 illustrates a gas turbine engine 10 of a type preferably provided for use in subsonic flight for driving a load 12, such as, but not limited to, a propeller or a helicopter rotor. Depending on the intended use, the engine 10 may be any suitable aircraft engine. In the present embodiment, the engine 10 is a gas turbine engine, and more particularly a turboprop, and generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow within an annular gaspath 26 from an inlet 17, at a rear portion of the engine 10, to an exhaust outlet 19, at a front portion of the engine 10, relative to a direction of travel T of the engine 10. This is in contrast to "through-flow" gas turbine engines in which gases flow through the core of the engine 10 from a front portion to a rear portion, in a direction opposite the direction of travel T. The engine 10 may be a reverse-flow engine (as illustrated) or a through-flow engine. The principles of the present disclosure can be applied to both reverse-flow and through-flow engines and to any other gas turbine engines, such as a turbofan engine and a turboshaft engine.

In the illustrated embodiment, the turbine section 18 has a high-pressure turbine 18A in driving engagement with a high-pressure compressor 14A. The high-pressure turbine 18A and the high-pressure compressor 14A are mounted on a high-pressure shaft 15. The turbine 18 has a low-pressure turbine, also known as power turbine 18B drivingly engaged to the load 12. The power turbine 18B is drivingly engaged to a low-pressure compressor 14B via a low-pressure shaft 22. A gearbox 20, which may be a planetary gearbox, is configured as a reduction gearbox and operatively connects the low-pressure shaft 22 that is driven by the power turbine 18B to a shaft 24 that is in driving engagement with the load 12, while providing a reduction speed ratio therebetween. In the present embodiment, the load 12 is a rotor of an aircraft, and more particularly a propeller 12, and thus the shaft 24 driving the aircraft rotor 12 is referred to as a rotor shaft.

It should be noted that the terms "upstream" and "downstream" used herein refer to the direction of an air/gas flow passing through the annular gaspath 26 of the gas turbine engine 10. It should also be noted that the term "axial", "radial", "angular" and "circumferential" are used with respect to a central axis 11 of the gaspath 26, which may also be a central axis of gas turbine engine 10. It should also be noted that expressions such as "extending radially" as used herein does not necessarily imply extending perfectly radially along a ray perfectly perpendicular to the central axis 11, but is intended to encompass a direction of extension that has a radial component relative to the central axis 11.

Figure 2:
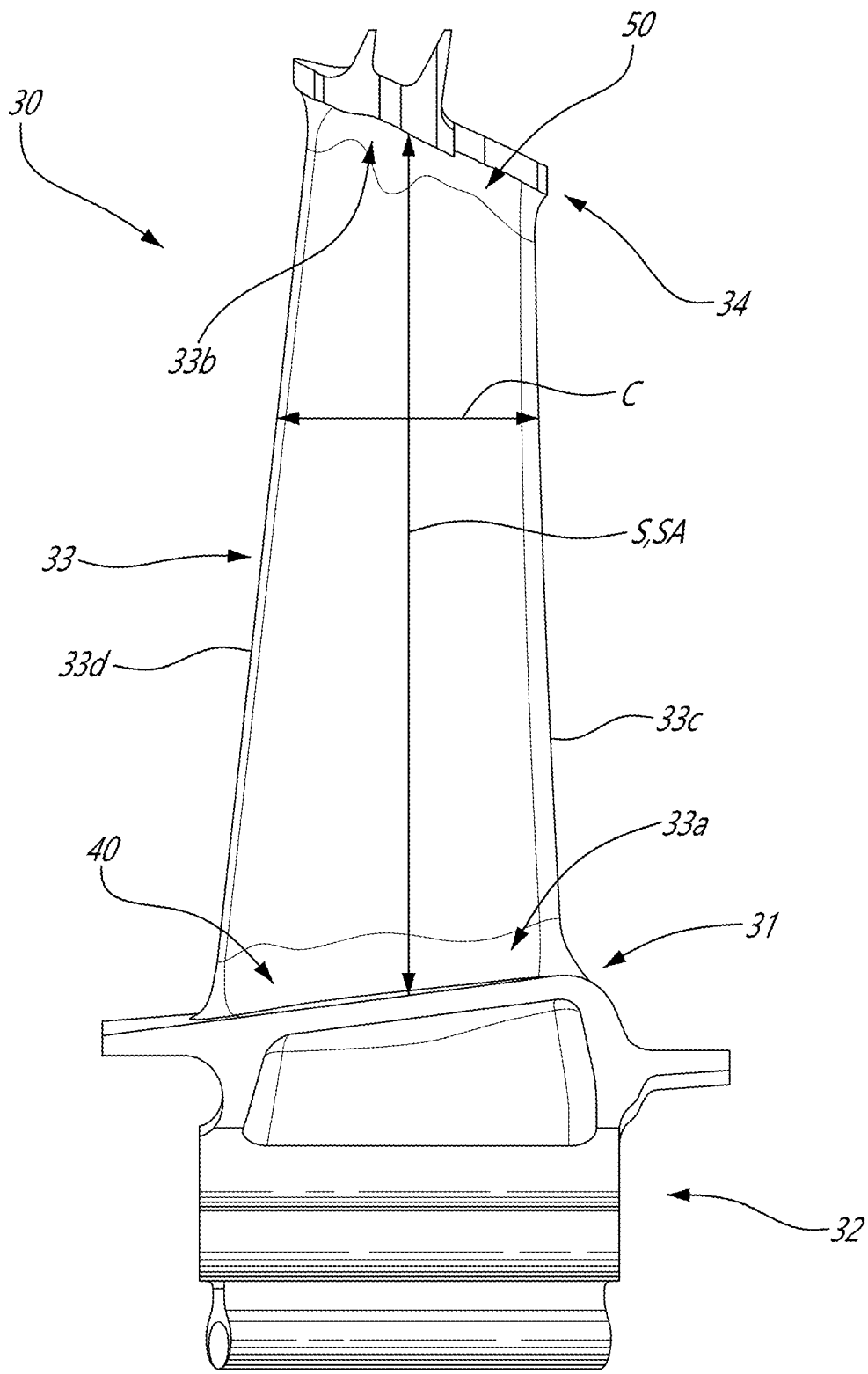
FIG. 2 is a schematic plan view of a turbine blade in accordance with one embodiment for the gas turbine engine of FIG. 1.

Referring to FIGS. 1-2, the high-pressure turbine 18a includes a rotor having a central hub 29 and a peripheral array of replaceable turbine blades 30. Any of the rotors of any of the high-pressure turbine 18a and the low-pressure turbine 18b may include blades as will be described herein below. In the embodiment shown, the disclosed turbine blades 30 are part of the high-pressure turbine 18a, which, in the present case, includes a single rotor.

Figure 3:
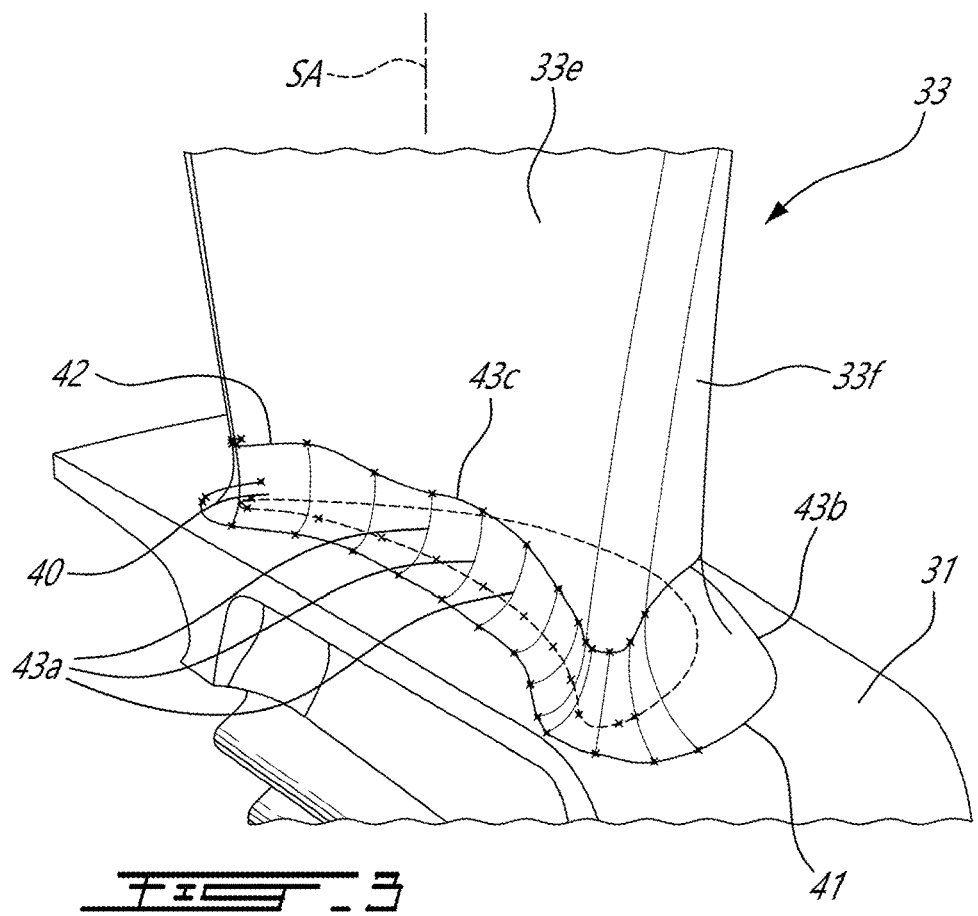
FIG. 3 is a three dimensional view of a portion of the turbine blade of FIG. 2 showing a platform, an airfoil of the blade, and a fillet at a junction therebetween.

Referring more particularly to FIGS. 2-3, the blade 30 has a platform 31 at its radially inner end that is exposed to the annular gaspath 26 and a root 32 protruding inwardly from the platform 31. The root 32 is received within correspondingly shaped slots defined by the central hub 29 (FIG. 1) to hold the blade 30 while the rotor is rotating about the central axis 11. The blade 30 has an airfoil 33 protruding from the platform 31 away from the root 32 in a spanwise direction along a span S. The airfoil 33 has a spanwise axis SA. The airfoil 33 has a base or inner end 33a at the platform 31 and a tip or outer end 33b radially spaced apart from the base 33a relative to the central axis 11. The airfoil 33 hence extends along a direction having a radial component relative to the central axis 11 from the base 33a to the tip 33b. The airfoil 33 extends in a chordwise direction from a leading edge 33c to a trailing edge 33d spaced apart from the leading edge 33c by a chord C. The airfoil 33 has a pressure side 33e and a suction side 33f opposed to the pressure side 33e. The pressure and suction sides 33e, 33f extend from the leading edge 33c to the trailing edge 33d and from the base 33a to the tip 33b. The chord C is a straight line connecting the leading edge 33c to the trailing edge 33d. The chord C may vary along the span S of the airfoil 33 between the base 33a and the tip 33b. The chord C differs from a camber line CL, which corresponds to a line that may be curved and that connects the leading edge 33c to the trailing edge 33d and that is centered between the pressure and suctions sides 33e, 33f. In the embodiment shown, the blade 30 is a shrouded blade in that a tip shroud 34 is secured to the tip 33b of the airfoil 33. The tip shroud 34 rotates with the airfoil 33 about the central axis 11 of the engine 10.

In use, the blade 30 is subjected to thermal and mechanical stresses. That is, the blade 30 is exposed to hot combustion gases exiting the combustion chamber 16 of the engine 10 and rotates at high speed subjecting the blade to important centripetal and aerodynamic forces. To at least partially alleviate the effect of those forces, inner and outer fillets 40, 50 are provided between the airfoil 33 and the root platform 31, and between the airfoil 33 and the tip shroud 34, respectively. Although the below description relates to the inner fillet 40, the principles of the present disclosure may apply similarly to the outer fillet 50. Additionally, it is to be understood that in another possible embodiment the blade includes only one fillet as described herein, either as an inner fillet 40 or an outer fillet 50. That is, a blade and/or vane may include a spline fillet as described herein at one of its inner and outer ends and another kind of fillet (e.g., constant radius fillet, elliptical fillet, conical fillet) at the other one of its inner and outer ends.

The inner and outer fillets 40, 50 may decrease constraint concentration that might be present at junctions between the airfoil 33 and the root platform 31 and tip shroud 34 if the fillets 40, 50 were absent. However, adding fillets may result in increasing a weight of the blade 30. This is undesired. The fillets 40, 50 described herein below are tailored to the specific operating conditions the blade 30 is subjected to and tailored to the geometry of the blade 30. Weight of the blade 30 using the disclosed fillets 40, 50 may therefore be reduced compared to a configuration using a traditional, uniform, fillet without compromising stress mitigating capabilities of the disclosed fillets 40, 50. Moreover, the disclosed fillets, which are spline fillets, allow to add bulges and/or recesses on the blade to cater to local stress concentrations.

The present disclosure is directed to a fillet with variable curvature for turbine blades and vanes. The fillet is created at the intersection of the airfoil 33 with the tip shroud 34 and/or root platform 31. This type of fillet may improve stress reduction. That is, the spline fillets described herein may reduce stress concentrations on the blade. Herein, "reduce stress concentrations" may imply a reduction in a number of locations where stress concentrations would be present but for the fillets and/or a reduction of a magnitude of a stress exerted on the blade at locations corresponding to stress concentrations. Aerodynamic efficiency may also benefit from this fillet.

Figure 4:
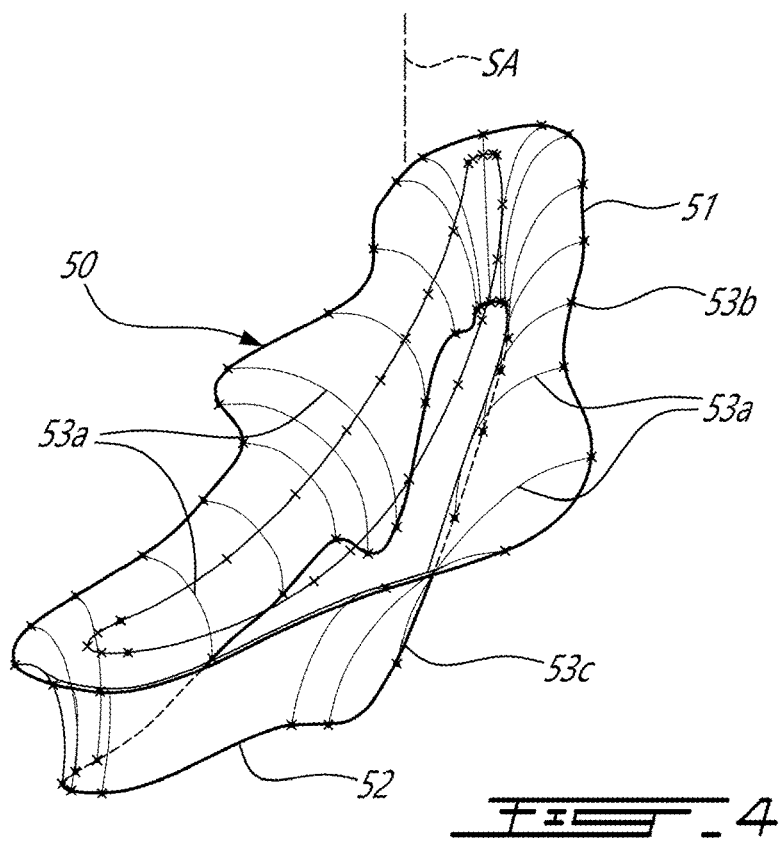
FIG. 4 is a three dimensional view of a spline fillet in accordance with one embodiment located at a junction of an outer shroud and the airfoil for the turbine blade of FIG. 3.

Referring more particularly to FIGS. 3-4, the inner fillet 40, which will be referred to below simply as "the fillet 40", extends from a platform end 41 at the platform 31 to an airfoil end 42 at the airfoil 33. The platform and airfoil ends 41, 42 may be seen as a boundary lines extending circumferentially around the airfoil 33. In practice, since the fillet 40 may merge tangentially to the platform 31 and to the airfoil 33, these boundary lines may be imaginary and not visible. The fillet 40 merges tangentially to the airfoil 33 at the airfoil end 42 and tangentially to the platform 31 at the platform end 41. As illustrated, dimensions of the fillet 40 vary around the airfoil 33. That is, a thickness of the fillet 40 is greater at mid-chord than that the leading and trailing edges. The disclosed spline fillets allow to adjust the size of the fillet 40 to cater to local stress concentration. This may allow to minimize the weight of the fillet 40, and of the blade 30, without compromising its mechanical properties.

Referring to FIG. 3, the fillet 40 has a plurality of fillet sections 43a distributed all around the airfoil 33. Each of the fillet sections 43a may be taken on a plane normal to both of the airfoil 33 and the platform 31. Each of the fillet sections 43a has a respective radius distribution extending from a first end 43b at the platform 31 to a second end 43c at the airfoil 33. The radius distribution includes values of the plurality of radii that makes the fillet, from the platform 31 to the airfoil 33. The radius distribution of the spline fillet sections 43a may allow features not possible with other kinds of fillets, such as conic fillets. These features are explained below.

Each of the fillet sections 43a has a length that extends from the platform end 41 to the airfoil end 42 along the fillet 40. The lengths of the fillet sections 43a vary around the airfoil 33. In other words, the lengths of the fillet sections 43a is non-uniform. In the embodiment shown, the fillet 40 has greater length at mid-chord than at the leading or trailing edges 33c, 33d. The spline fillets disclosed herein may allow to locally select a fillet length to cater to stress concentrations present at that location. In the present embodiment, the fillet section 43a having the maximum length is located on the suction side 33f of the airfoil 33. As shown in FIG. 4, a height of the fillet 40 along the span S varies all around the airfoil body 33. Similarly, a width of the fillet 40 on a direction transverse to the chord C varies all around the airfoil body 33.

Referring to FIG. 4, the outer fillet 50 has a plurality of fillet sections 53a distributed all around the airfoil 33. Each of the fillet sections 53a may be taken on a plane normal to both of the airfoil 33 and the platform 31. Each of the fillet sections 53a has a respective radius distribution extending from a first end 53b at the platform 31 to a second end 53c at the airfoil 33. The radius distribution includes values of the plurality of radii that makes the fillet, from the platform 31 to the airfoil 33. The radius distribution of the spline fillet sections 53a may allow features not possible with other kinds of fillets, such as conic fillets. These features are explained below.

Each of the fillet sections 53a has a length that extends from the platform end 51 to the airfoil end 52 along the fillet 50. The lengths of the fillet sections 53a vary around the airfoil 33. In other words, the lengths of the fillet sections 53a is non-uniform. In the embodiment shown, the fillet 50 has greater length at mid-chord than at the leading or trailing edges 33c, 33d. The spline fillets disclosed herein may allow to locally select a fillet length to cater to stress concentrations present at that location. In the present embodiment, the fillet section 53a having the maximum length is located on the suction side 33f of the airfoil 33. As shown in FIG. 4, a height of the fillet 50 along the span S varies all around the airfoil body 33. Similarly, a width of the fillet 50 on a direction transverse to the chord C varies all around the airfoil body 33.

The spline fillets differ from traditional fillet in that their shape may be controlled and adapted to specific operating conditions. That is, a radius of the fillet may vary continuously from the platform 31 to the airfoil 33 and may define local maximum(s) and local minimum(s). It may therefore be possible to locally select a thickness of the fillet to address some local stress concentrations. The spline fillet of a given fillet section 43 may allow to locally increase the thickness at a given location between the airfoil and platform ends 41, 42 without having to increase the thickness of the whole fillet section. The spline fillet may allow for flexibility in designing fillet and to put the added material where it has the more impact on stress reduction while limiting weight penalties. This might not be possible with a conic fillet described below with reference to FIG. 5. The local maximum and local minimum are located on the fillet at locations offset from both of the airfoil 33 and the platform 31.

Figure 5:
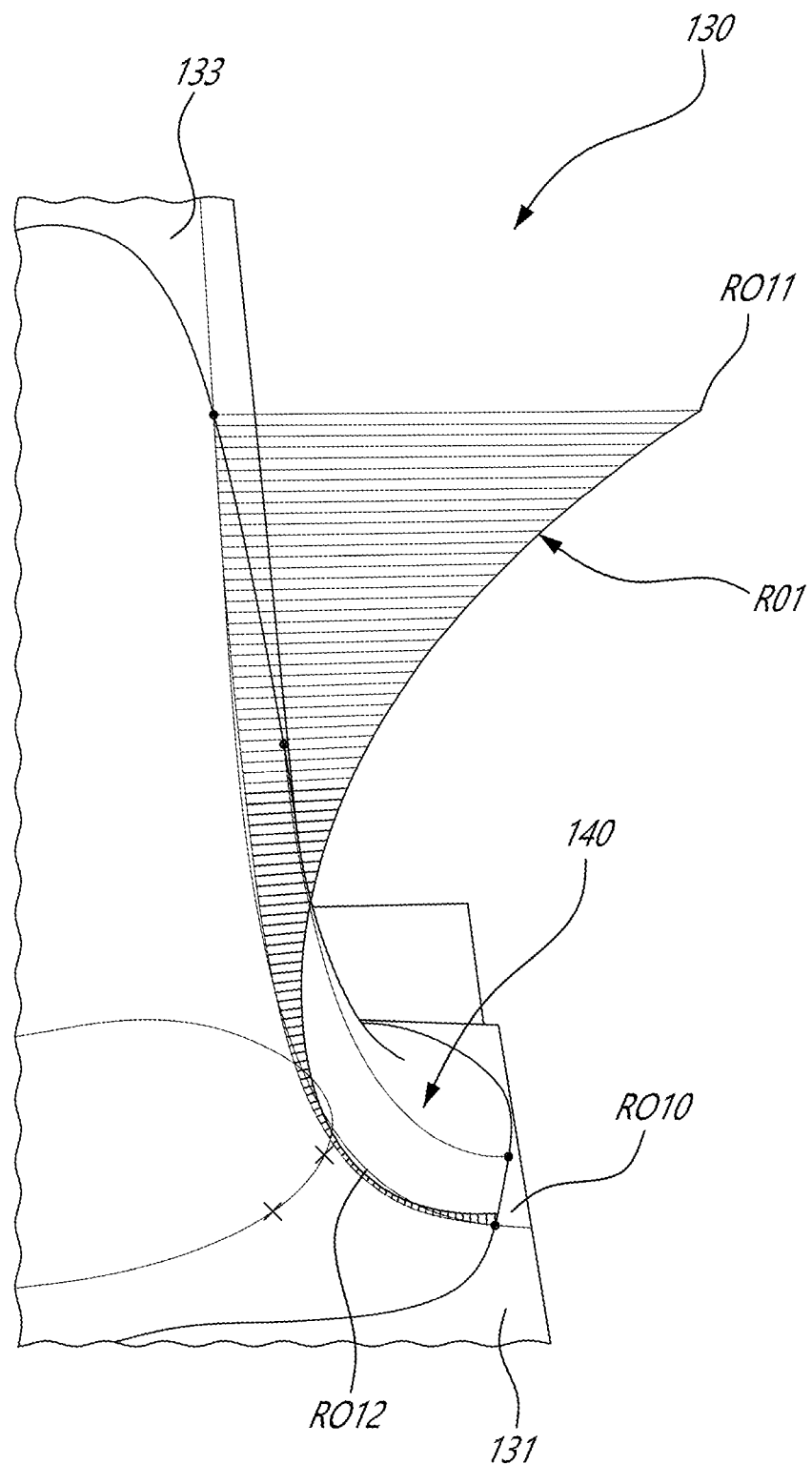
FIG. 5 is a three dimensional view of a portion of a blade having a conical fillet.

Referring now to FIG. 5, a blade 130 in accordance with another embodiment is shown. The blade 130 has a conic fillet 140 between an airfoil 133 and a platform 131. The radius distribution at one section of the conic fillet 140 is shown with the line denoted R01. Specifically, the greater the distance between the fillet 140 and the line R01, the greater the radius of the fillet 140. It is understood that the line R01 is not visible on the blade 130. This line is computer-generated and is used to represent local values of radii of the fillet 140 along its length.

The conic fillet 140 as a start radius R010 at the platform 131 and an end radius R011 at the airfoil 133. The radius of the conic fillet 140 monotonically and continuously decreases from the start radius R010 to a local minimum R012 and monotonically and continuously increases from the local minimum R012 to the end radius R010. A conic fillet is limited to a single local maximum between the platform 131 and the airfoil 133. Moreover, the fillet 140 is concave from the platform 131 to the airfoil 133. Conic fillets may impose limits on shapes. However, the above described general shape of the conic fillet 140 may be not optimal at certain locations. Hence, conic fillet are limited to one local extremum and cannot define convex portions.

Figure 6:
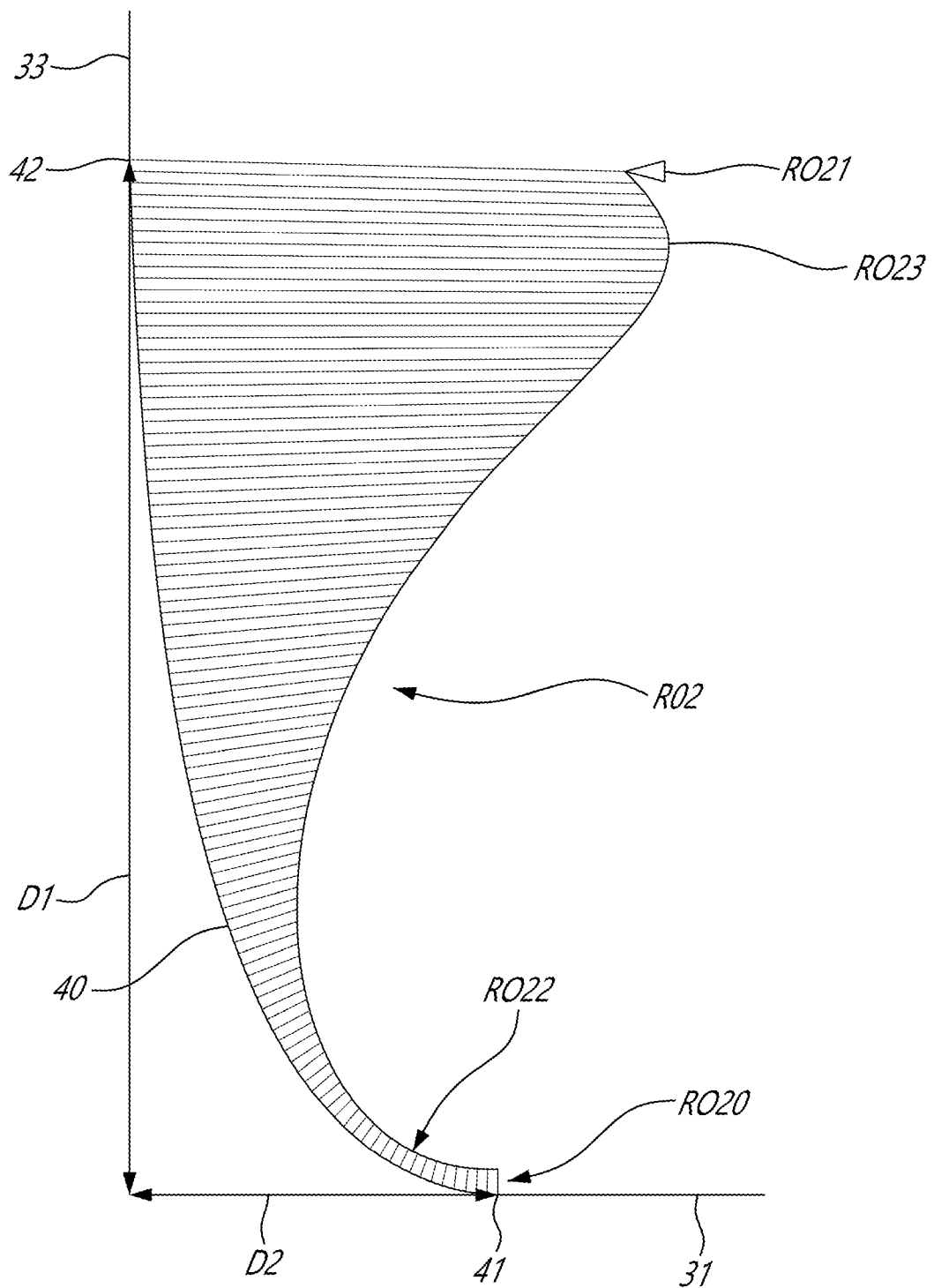
FIG. 6 is a plan view of a portion of a surface of the blade of FIG. 3 illustrating a radius distribution of a first exemplary shape of a fillet section of the spline fillet of FIG. 4 taken at a given chordwise location.

Referring now to FIG. 6, a first exemplary shape for one of the fillet sections 43 of the fillet 40 is shown. The first exemplary shape has a radius distribution R02. The radius distribution R02 has a start radius R020 at the platform 31, an end radius R021 at the airfoil 33, a local minimum radius R022 between the start radius R020 and the end radius R021, and a local maximum radius R023 between the local minimum radius R022 and the end radius R021. The local maximum radius R023 is offset from the local minimum radius R022 relative to the span S. The radius of the fillet 40 at this particular fillet section 43a increases from the local minimum radius R022 along the spanwise direction toward both of the airfoil 33 and the platform 31. The radius of the fillet decreases from the local maximum R023 along the spanwise direction toward both of the airfoil 33 and the platform 31. The spline fillet allows to locally control the radius of the fillet to cater to local stress concentrations that would be present otherwise. A fillet section of the fillet 40 having this particular first exemplary shape may be located on the pressure side 33e and/or the suction side 33f of the airfoil 33 as will be described below. In the present embodiment, the radius of the fillet 40 at this fillet section 43 decreases from the start radius R020 to the local minimum radius R022, increases from the local minimum radius R022 to the local maximum radius R023 and decreases from the local maximum radius R023 to the end radius R021 at the airfoil 33.

In the embodiment shown, a difference between the start fillet radius R020 and the local minimum R022 is different than a difference between the end fillet radius R021 and the local maximum R023. The spline fillet may allow flexibility in the selection of the radii of the radius distribution R02. The radius may decrease sharply from the start fillet radius R020 and increase smoothly from the local minimum radius R022 to the local maximum radius R023. In the embodiment shown, the location of the local minimum radius R022 is closer to the platform 31 than the local maximum radius R021. The opposite is possible. That is, in an alternate embodiment, the local maximum radius may be closer to the platform than the local minimum radius. The position of the local maximum and minimum radii R022, R023 along the span S may be varied in function of the locations of the stress concentrations. More than two local extrema (e.g., local maximum, local minimum) may be provided as will be discussed below.

In the present case, the fillet 40 at this fillet section 43a has a greater height along the span than a width in a direction transverse to the chord C. That is, a ratio of a first distance D1 between the airfoil end 42 and the platform 31 to a second distance D2 between the airfoil 33 and the platform end 41 is greater than 1. The distances D1 and D2 are selected to achieve the desired maximum stress value. Typically, increasing the distance D1 decreases the stress.

Figure 7:
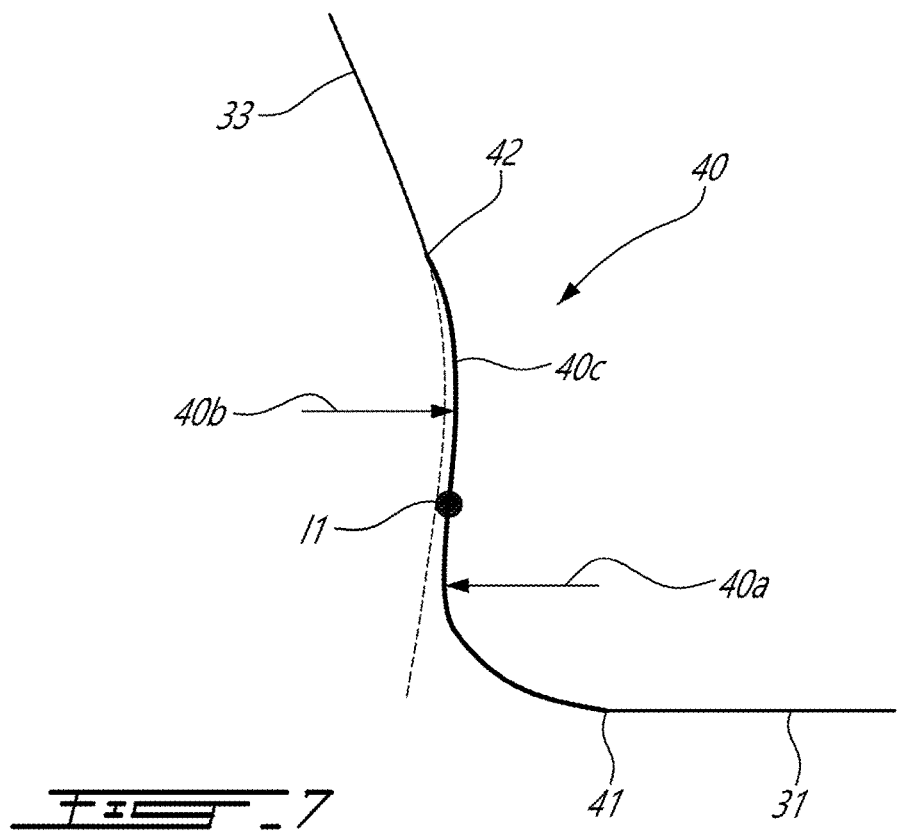
FIG. 7 is a plan view illustrating a portion of a surface of the blade of FIG. 3 illustrating a second exemplary shape of a fillet section of the spline fillet of FIG. 4 taken at another given chordwise location.

Referring now to FIG. 7, a second exemplary shape for one of the fillet sections 43a of the fillet 40 is shown. This second exemplary shape defines a concave portion 40a and a convex portion 40b. The concave portion 40a extends from the platform 31 to an inflection point I1 and the convex portion 40b extends from the inflection point I1 to the airfoil 33. A shape of the airfoil 33 if the fillet 40 were absent is shown with a phantom line. At the inflection point I1, the radius of the fillet 40 is infinite. That is, the curvature exhibits a reversal and changes sign from negative at the concave portion 40a to positive at the convex portion 40b. This allows to create a bulge 40c in the fillet 40. The location of this bulge 40c is selected to correspond to a location of a local stress concentration to at least partially alleviate stress. The radius distribution of this second exemplary shape has a start radius at the platform 31 from which the radius increases up to infinity at the inflection point I1. From the inflection point I1, the radius of the fillet 40 decreases toward an end radius to meet the airfoil 33. In the present case, the end radius of this second exemplary shape is greater than the radius of the airfoil 33 allowing to create the bulge 40c. A fillet section having this particular second exemplary shape of the fillet 40 may be located on the suction side 33f of the airfoil 33 as will be described below. Although, other locations (e.g., pressure side 33e) on the fillet 40 may have this particular second exemplary shape.

Figure 8:
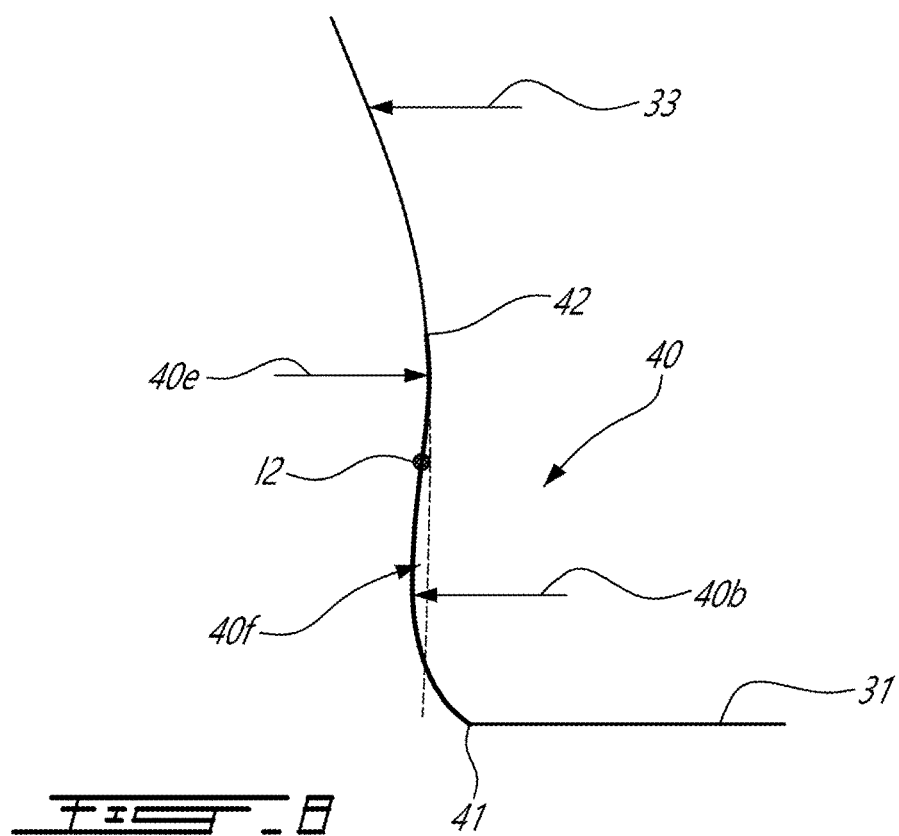
FIG. 8 is a plan view illustrating a portion of a surface of the blade of FIG. 3 illustrating a third exemplary shape of a fillet section of the spline fillet of FIG. 4 taken at yet another given chordwise location.

Referring now to FIG. 8, a third exemplary shape for one of the fillet sections 43 of the fillet 40 is shown. This third exemplary shape defines a concave portion 40d and a convex portion 40e. The concave portion 40d extends from the platform 31 to an inflection point I2 and the convex portion 40e extends from the inflection point I2 to the airfoil 33. A shape of the airfoil 33 if the fillet 40 were absent is shown with a phantom line. At the inflection point I2, the radius of the fillet 40 is infinite. That is, the curvature change sign from negative at the concave portion 40d to positive at the convex portion 40e. The radius distribution of this third exemplary shape has a start radius at the platform 31 from which the radius increases up to infinity at the inflection point 12. From the inflection point 12, the radius of the fillet 40 decreases toward an end radius to meet the airfoil 33. In the present case, the end radius of this third exemplary shape matches the radius of the airfoil 33 allowing to create an undercut 40f. This undercut 40f is located at the concave portion 40d of this fillet section 43 of the fillet 40. The undercut 40f may allow material to be removed at locations less prone to mechanical stress concentration. This may allow weight savings at certain locations of the fillet 40 around the airfoil 33. Removing material at certain locations may be used to decrease stress on the blade.

Figure 9:
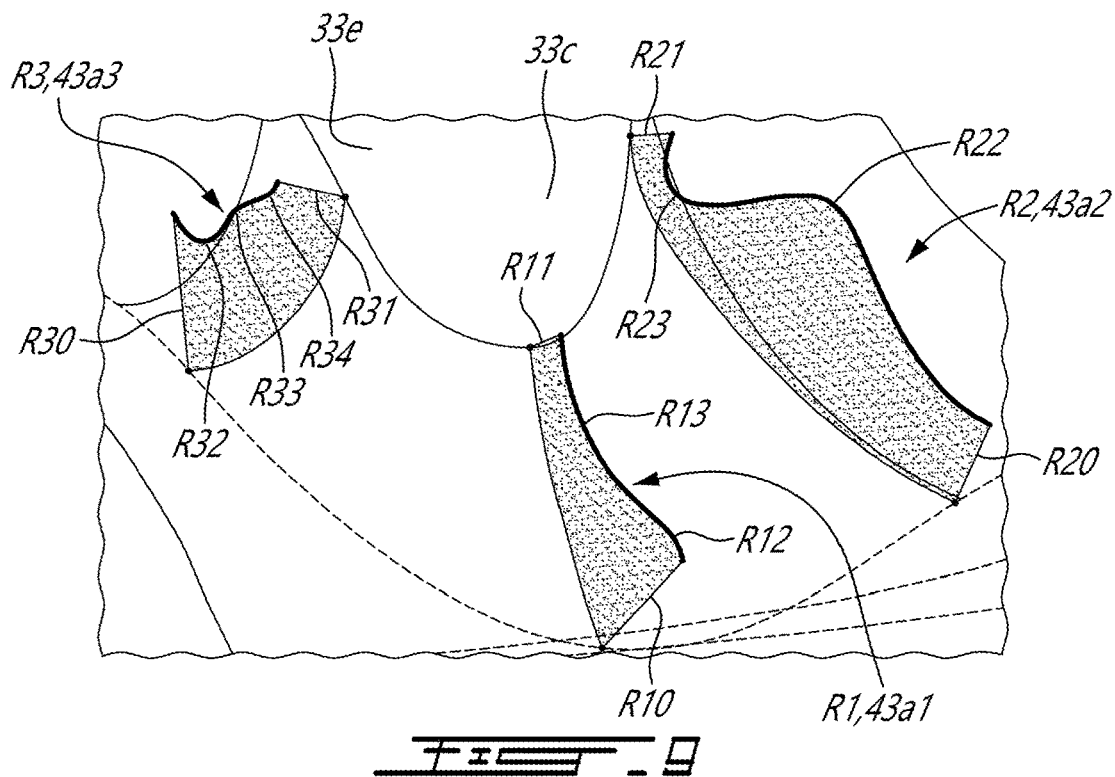
FIG. 9 is an enlarged three dimensional view of a portion of the blade of FIG. 3 illustrating a radii variations of different fillet sections around at and around a leading edge of the blade of FIG. 3.

Referring now to FIG. 9, three radius distributions, R1, R2, and R3 of the fillet 40 at a first fillet section 43a1 at the leading edge 33c, a second fillet section 43a2 on the suction side 33f, and a third fillet section 43a3 on the pressure side 33e are shown. Each of those radius distributions, R1, R2, R3 are described hereinbelow. The second and third fillet sections 43a2, 43a3 are located at about 2% of the chord from the leading edge 33c.

The radius distribution R1 of the leading edge fillet section 43a1 intersects the leading edge 33c of the airfoil 33. The radius distribution R1 has a first radius R10 at the platform 31 and a second radius, or an end radius, R11 at the airfoil 33. The radius increases from the start radius R10 to a local maximum radius R12. From the local maximum radius R12, the radius decreases to a local minimum radius R13, and from the local minimum radius R13, the radius increases to the end radius R11. In this case, the radius distribution presents a local maximum radius and a local minimum radius.

The second fillet section 43a2 includes a radius distribution R2 having a start radius R20 at the platform 31 and an end radius R21 at the airfoil 33. The radius increases from the start radius R20 to a local maximum radius R22 and decreases from the local maximum radius R22 to a local minimum radius R23. The radius then increases from the local minimum radius R23 to the end radius R21.

The third fillet section 43a3 includes a radius distribution R3 that has a first radius R30 at the platform 31 and an end radius R31 at the airfoil 33. The radius decreases from the start radius R30 to a local minimum radius R32, increases from the local minimum radius R32 to a local maximum radius R33, and decreases from the local maximum radius R33 to a second local minimum radius R34. From this second local minimum radius R34, the radius increases to the end radius R31 at the airfoil 33. In this case, the radius distribution R3 has two local minimum radii and one local maximum radius located between the two local minimum radii.

Figure 10:
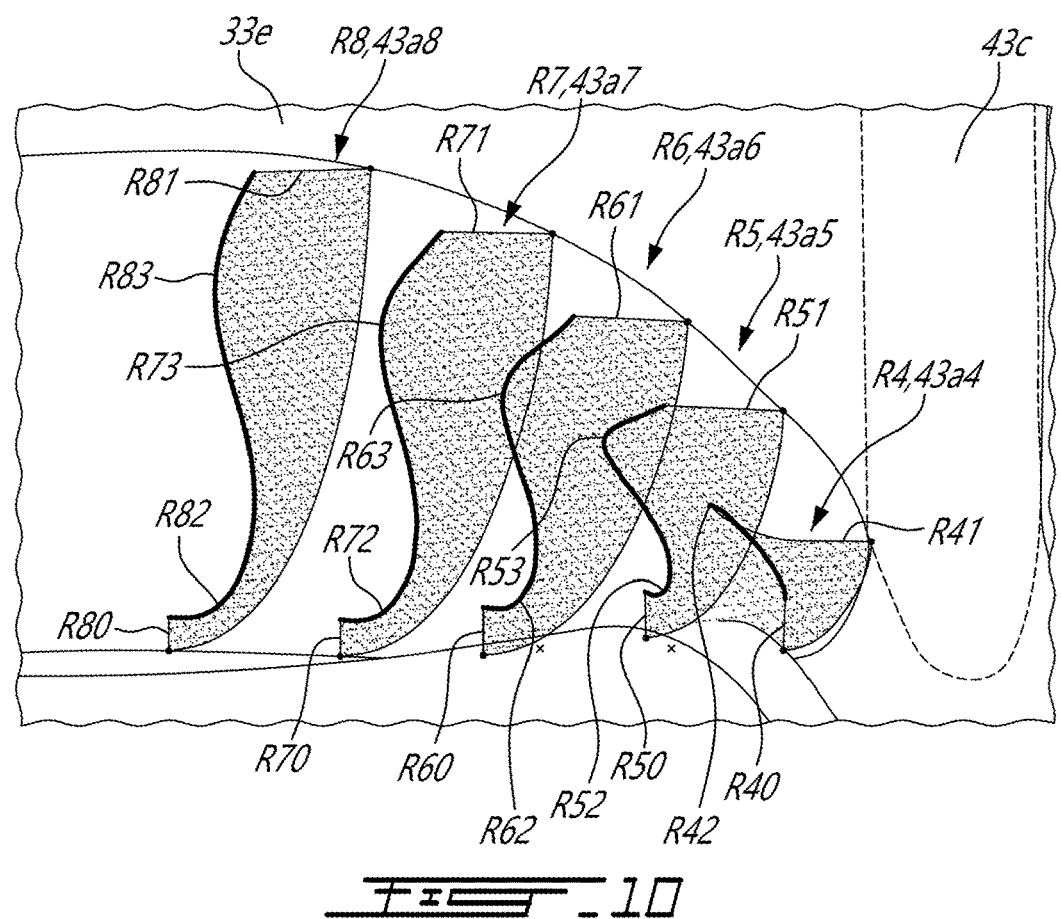
FIG. 10 is an enlarged three dimensional view of another portion of the blade of FIG. 3 illustrating radii variations of different fillet sections on a pressure side of the blade of FIG. 3.

Referring now to FIG. 10, five radius distributions on the pressure side 33e of the airfoil 33 are shown. Respectively, we have a fourth fillet section 43a4, a fifth fillet section 43a5, a sixth fillet section 43a6, a seventh fillet section 43a7, and an eighth fillet section 43a8. The locations of each of those fillet sections is about 5%, about 10%, about 15%, about 20%, and about 25% of the chord from the leading edge 33c. Herein, the expression "about" implies a variation by plus or minus 10%.

The fourth fillet section 43a4 has a radius distribution R4 that has a first radius R40 at the platform 31 and a second radius R41 at the airfoil 33. The radius increases from the start radius R40 to a maximum radius R42 and decreases from this maximum radius R42 to the end radius R41.

The fifth, sixth, seventh, and eighth pressure side fillet section 43a5, 43a6, 43a7, and 43a8 have each a radius distribution R5, R6, R7, and R8 that includes a start radius R50, R60, R70, R80 at the platform and an end radius R51, R61, R71, R81 at the airfoil 33. The radius decreases from the start radius R50, R60, R70, R80 to a local minimum radius R52, R62, R72, R82 and increases from the local minimum radius R52, R62, R72, R82 to a local maximum radius R53, R63, R73, R83, and decreases from the local maximum radius R53, R63, R73, R83 to the end radius R51, R61, R71, R81.

Figure 11:
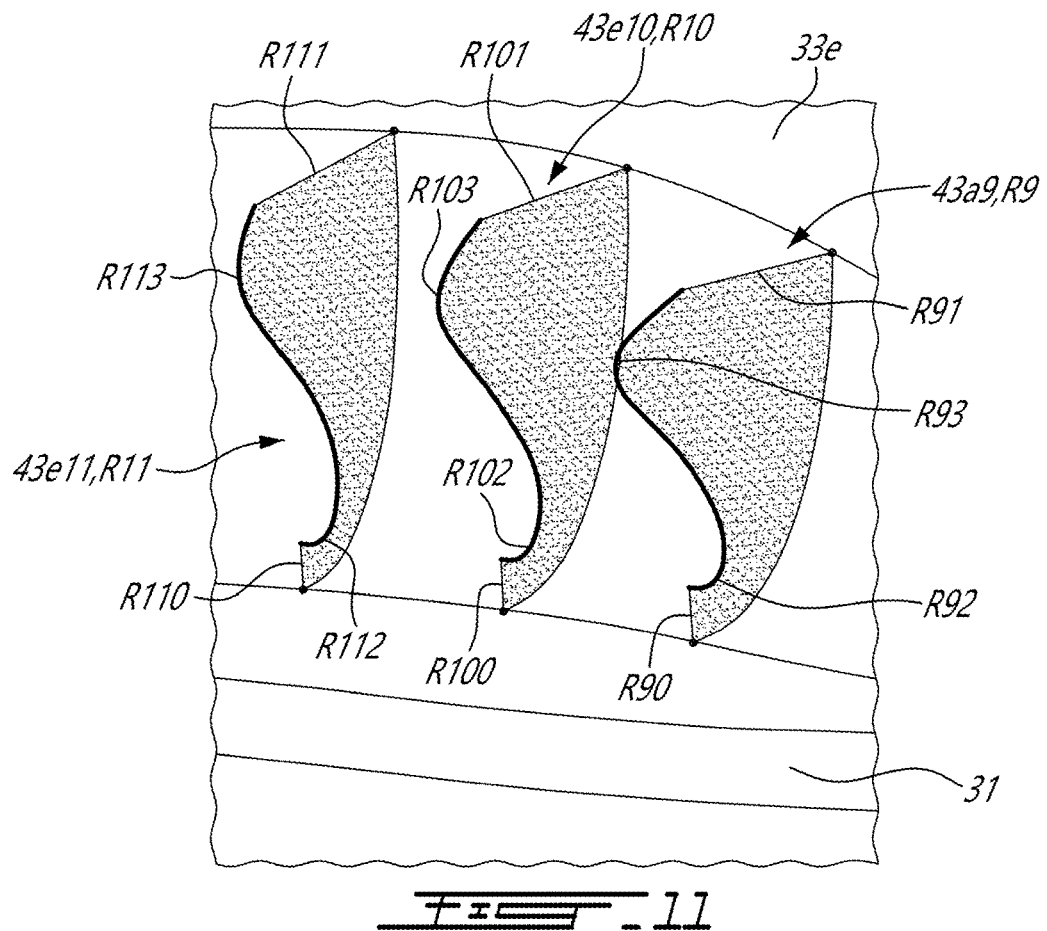
FIG. 11 is an enlarged three dimensional view of another portion of the blade of FIG. 3 illustrating radii variations of different fillet sections of the pressure side.

Referring now to FIG. 11, a ninth, tenth, and eleventh fillet sections 43a9, 43a10, 43a11 are located on the pressure side 33e of the airfoil 33 at respectively about 25%, about 37.5%, and about 50% of the chord from the leading edge 33c. The ninth, tenth, and eleventh fillet sections 43a9, 43a10, 43a11 each includes a radius distribution R9, R10, R11 having a start radius R90, R100, R110 at the platform 31, an end radius R91, R101, R111 at the airfoil 33, a local minimum radius R92, R102, R112, and a local maximum radius R93, R103, R113. The radii decrease from the start radii R90, R100, R110 to the local minimum radii R92, R102, R112, and increase from the local minimum radii R92, R102, R112 to the local maximum radii R93, R103, R113. From the local maximum radii R93, R103, R113, the radii decrease to the end radii R91, R101, R111 at the airfoil 33.

Figure 12:
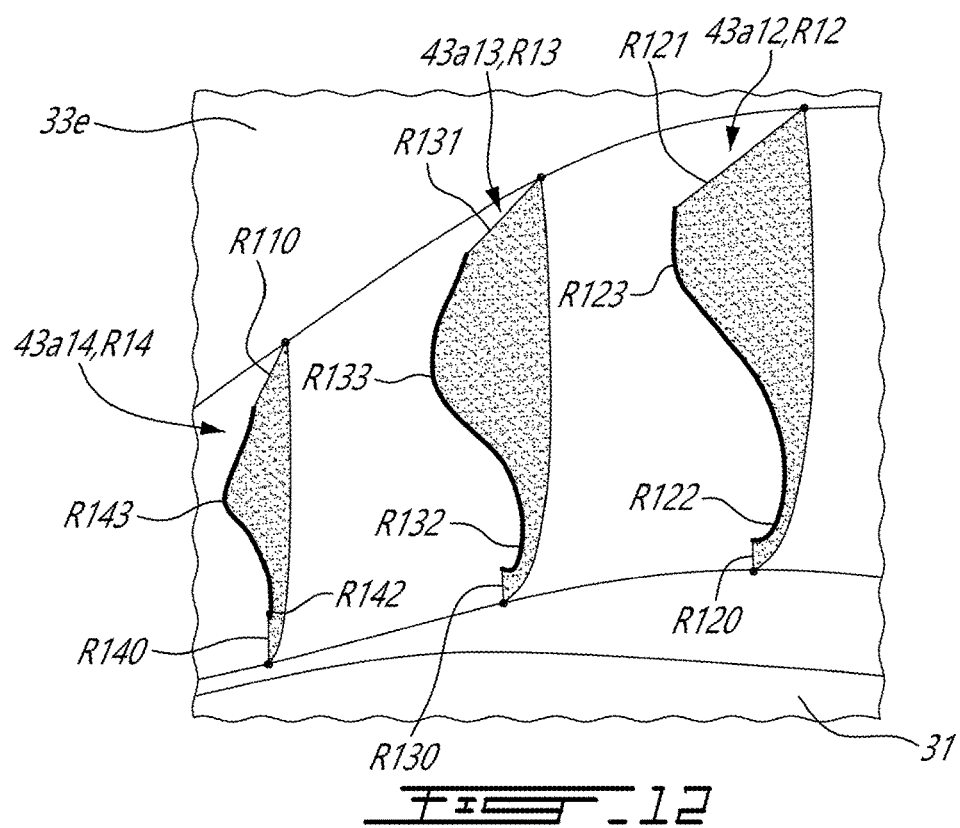
FIG. 12 is an enlarged three dimensional view of another portion of the blade of FIG. 3 illustrating radii variations of different fillet sections of the pressure side.

Referring now to FIG. 12, a twelfth, thirteenth, and fourteenth fillet sections 43a12, 43a13, and 43a14 are located on the pressure side 33e of the airfoil 33 at respectively about 62.5%, about 75%, and about 82.5% of the chord from the leading edge 33c. The twelfth, thirteenth, and fourteenth fillet sections 43a12, 43a13, and 43a14 each includes a radius distribution R12, R13, R14 having a start radius R120, R130, R140 at the platform 31, an end radius R121, R131, R141 at the airfoil 33, a local minimum radius R122, R132, R142, and a local maximum radius R123, R133, R143. The radii decrease from the start radii R120, R130, R140 to the local minimum radii R122, R132, R142, and increase from the local minimum radii R122, R132, R142 to the local maximum radii R123, R133, R143. From the local maximum radii R123, R133, R143, the radius decrease to the end radii R121, R131, R141 at the airfoil 33.

Figure 13:
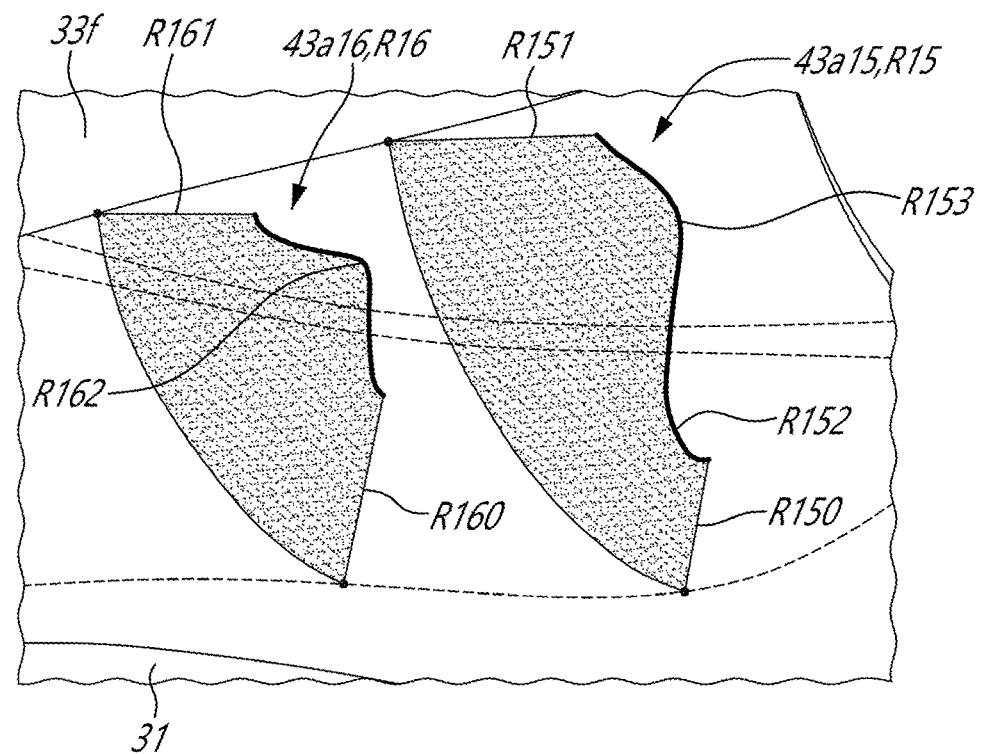
FIG. 13 is an enlarged three dimensional view of another portion of the blade of FIG. 3 illustrating radii variations of different fillet sections of a suction side of the blade of FIG. 3.

Referring now to FIG. 13, a fifteenth fillet section 43a15 is located on the suction side 33f of the airfoil 33 at about 80% of the chord from the leading edge 33c. It includes a radius distribution R15 having a start radius R150 at the platform 31 and an end radius R151 at the airfoil 33. The radius decreases from the start radius R150 to a local minimum radius R152, increases from the local minimum radius R152 to a local maximum radius R153, and decreases from the local maximum radius R153 to the end radius R151. A sixteenth fillet section 43a16 is located on the suction side 33f of the airfoil ab about 70% of the chord from the leading edge 33c. The sixteenth fillet section 43a16 and includes a radius distribution R16 having a start radius R160 and an end radius R161. The radius increases from the start radius R160 to a local maximum radius R162, and decreases from the local maximum radius R162 to the end radius R161.

Figure 14:
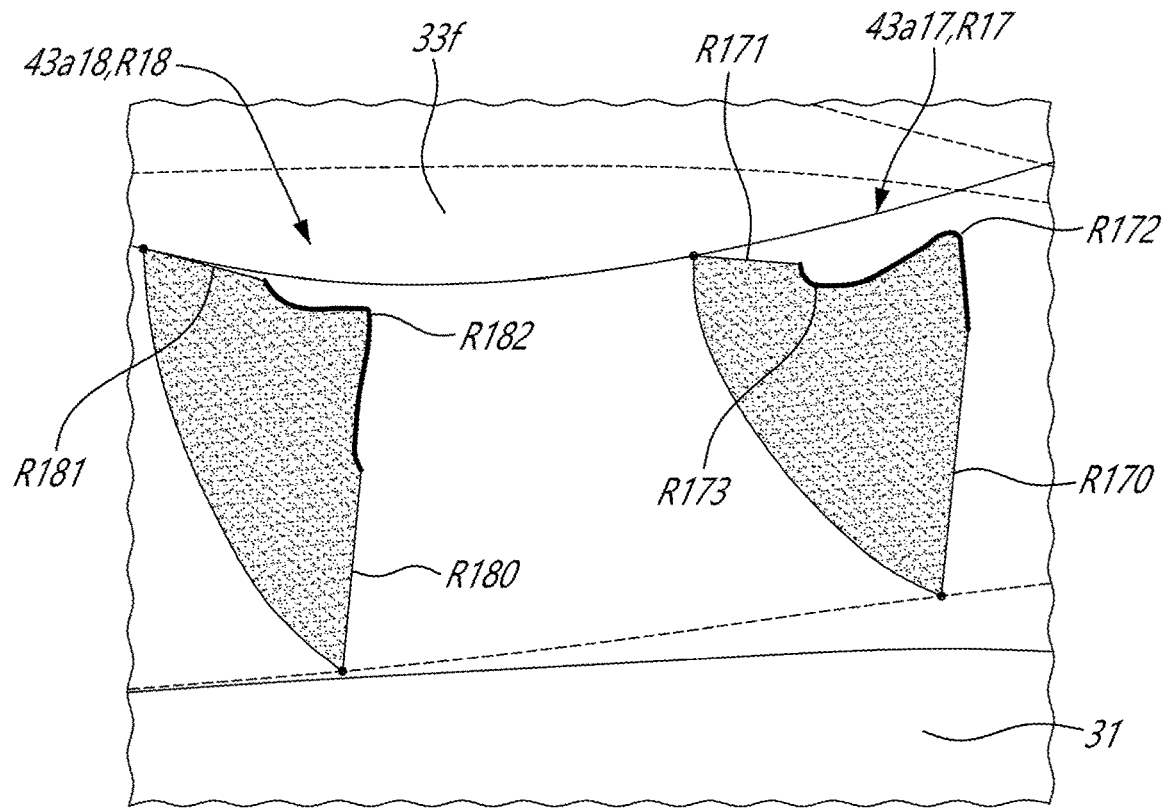
FIG. 14 is an enlarged three dimensional view of another portion of the blade of FIG. 3 illustrating radii variations of different fillet sections of the suction side.

Referring now to FIG. 14, a seventeenth fillet section 43a17 is located on the suction side 33f of the airfoil 33 at about 60% of the chord from the leading edge 33c. The seventeenth fillet section 43a17 includes a radius distribution R17 having a start radius R170 at the platform 31 and an end radius R171 at the airfoil 33. The radius increases from the start radius R170 to a local maximum radius R172, and decreases from the local maximum radius R172 to a local minimum radius R173. The radius then increases from the local minimum radius R173 to reach the end radius R171 at the airfoil 33.

The fillet 40 has an eighteenth fillet section 43a18 on the suction side 33f of the airfoil 33 and is located at about 50% of the chord from the leading edge 33c of the airfoil 33. It includes a radius distribution R18 having a start radius R180, an end radius R181, and a local maximum radius R182. The radius increases from the start radius R180 to the local maximum radius R182, and decreases from the local maximum radius R182 to the end radius R181 at the airfoil 33.

Figure 15:
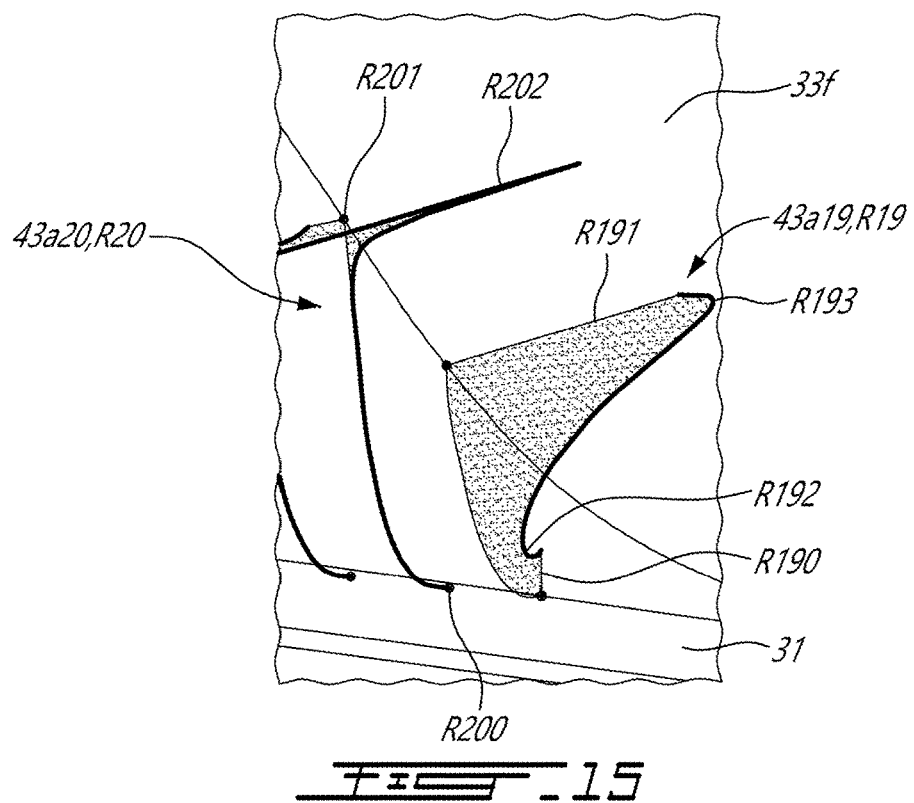
FIG. 15 is an enlarged three dimensional view of yet another portion of the blade of FIG. 3 illustrating radii variations of different fillet sections of the suction side.

Referring now to FIG. 15, a nineteenth fillet section 43a19 is located on the suction side 33f of the airfoil 33 and is located at about 40% of the chord from the leading edge 33c. It includes a radius distribution R19 having a start radius R190 at the platform 31, an end radius R191 at the airfoil 33. The radius decreases from the start radius R190 to a local minimum radius R192, increases from the local minimum radius R192 to a local maximum radius R193, and decreases from the local maximum radius to reach the radius R191 at the airfoil 33. A twentieth fillet section 43a20 is located on the suction side 33f of the airfoil 33 at about 35% of the chord from the leading edge 33c. It has a radius distribution R20 having a start radius R200 at the platform 31, and an end radius R201 at the airfoil 33. Between the start and end radii R200 and R201, the radius distribution defines an inflection point in which the radius R202 is infinite. More specifically, the twentieth radius distribution R20 matches the radius distribution described herein above with reference to FIG. 7.

Figure 16:
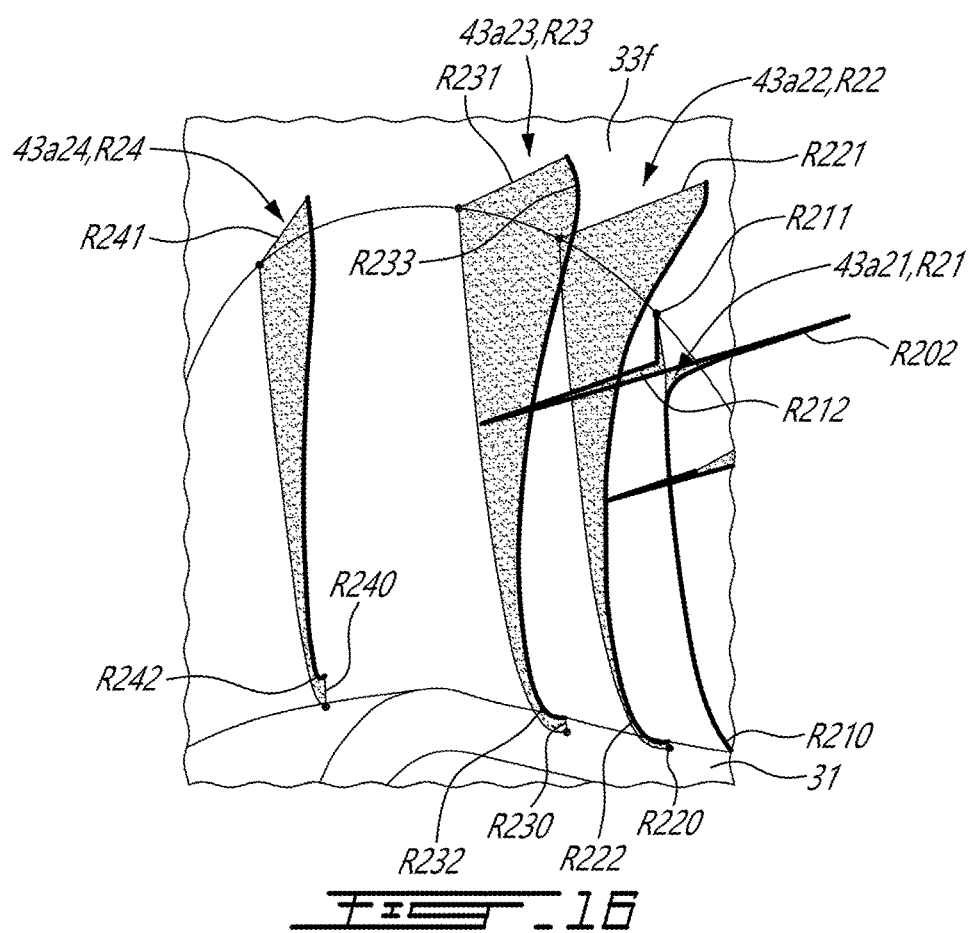
FIG. 16 is an enlarged three dimensional view of still yet another portion of the blade of FIG. 3 illustrating radii variations of different fillet sections of the suction side proximate the leading edge of the blade of FIG. 3.

Referring now to FIG. 16, a twenty-first fillet section 43a21 is located on the suction side 33f of the airfoil 33 at about 30% of the chord from the leading edge 33c. It includes a radius distribution R21 having a start radius R210 at the platform 31, an end radius R211 at the airfoil 33, and an infinite radius R212 therebetween. An inflection point is therefore defined by this twenty-first fillet section 43a21. More specifically, the twenty-first radius distribution R21 matches that described herein above with reference to FIG. 7.

A twenty-second fillet section 43a22 is located on the suction side 33f of the airfoil 33 at about 25% of the chord from the leading edge 33c. It includes a radius distribution R22 having a start radius R220 and an end radius R221. The radius decreases from the start radius R220 to a local minimum radius R222, and increases from the local minimum radius R222 to the end radius R221. The fillet 40 includes a twenty-third fillet section 43a23 on the suction side 33f of the airfoil 33 at about 20% of the chord from the leading edge 33c. It includes a radius distribution R23 having a start radius R230 and an end radius 231. The radius decreases from the start radius R230 to a local minimum radius R232, and increases from the local minimum radius R232 to a local maximum radius R233, and decreases therefrom to the end radius R231. The fillet 40 has a twenty-fourth fillet section 43a24 located on the suction side 33f of the airfoil 33 at about 10% of the chord from the leading edge 33c and has radius distribution R24 having a start radius R240 and an end radius R241. The radius distribution R24 has a local minimum radius R242. The radius decreases from the start radius R240 to the local minimum radius R242, and increases from the local minimum radius R242 to the end radius R241.

It is understood that the twenty-four sections described herein above are exemplary only and that another fillet may have different sections. Moreover, each of the twenty-four sections described herein above may be used at other locations around the airfoil. For instance, although the $N_{th}$ section (e.g., first, second, third, etc) was described as being located at a given distance from the leading edge on the pressure or suction side, a spline fillet in accordance with another embodiment may have a section having a similar radius distribution as the $n^{th}$ section, but located elsewhere around the airfoil. The description of the many fillet sections is intended to provide examples of radius distributions that may be used for a spline fillet. There is no intention to limit a specific radius distribution to a particular location on an airfoil. Each airfoil, whether it is a compressor blade, a turbine blade, a compressor vane, a turbine vane, a fan blade, and/or a fan stator is subjected to its respective operating conditions. A given radius distribution might be suitable for a turbine blade, but be less desirable for a compressor vane.

For manufacturing the blade, the airfoil is provided with at least one end thereof joined to a platform; and a spline fillet is formed between said at least one end of the airfoil and the platform, the spline fillet having a radius distribution at a determined chordwise location, the radius distribution including a first radius of the fillet and a second radius of the fillet, the first radius being a local minimum radius, the second radius being a local maximum radius, a radius of the fillet increasing from the local minimum along a spanwise direction toward both of the airfoil and the platform, the radius decreasing from the local maximum along the spanwise direction toward both of the airfoil and the platform.

In one particular embodiment, the present method of manufacturing a fillet at a junction between an airfoil body and a platform at one or both of inner and outer ends of the airfoil body, includes determining a chordwise location of a stress concentration on the airfoil body; determining parameters of a radius distribution of the fillet at the determined chordwise location, the determined parameters and/or the radius distribution including a first radius of the fillet and a second radius of the fillet, the first radius being a local minimum radius, the second radius being a local maximum radius, a radius of the fillet increasing from the local minimum along a spanwise direction toward both of the airfoil and the platform, the radius decreasing from the local maximum along the spanwise direction toward both of the airfoil and the platform; and forming the fillet having the determined parameters at the junction between the airfoil body and the platform.

The disclosed fillets may be extended either along the airfoil height, or along the base of the airfoil, without adding material at the opposing end, as would a constant radius fillet or elliptical fillet. Although it may be possible to modify an elliptical fillet by adding material at one end, but not at the opposite end, increasing a dimension of the fillet at the one end will add material along an entire length of the fillet up to the opposite end. Spline fillets as disclosed in the present disclosure allows to add less total material. By controlling the spline parameters, the fillet may also be made to follow the airfoil or the platform more or less closely as desired, giving additional control on the quantity of material added. In one case, even a reversal of curvature may be produced. When applied on a turbine blade, the fillet may have a plurality of bulges located at the areas where the stresses generated by rotating, resonance and thermal stresses are the highest. By making the fillets in the disclosed manner, the added bulge may only add material in the area needed, avoiding undesired bulges or added material in the remaining portion of the fillet, which can lead to undesired weight or stresses. Additionally, the spline fillet may allow for increased control of the rate of curvature, which may further improve the designer's ability to reduce local stresses.

It will be understood that the fillets disclosed herein are not limited to be implemented in turbine blades. Compressor blades, turbine vanes, and/or compressor vanes may incorporate fillets as described herein.

The principles of the present disclosure may apply to any airfoil of a gas turbine engine that has a shroud and/or a platform. These airfoils may be, for instance, compressor blades, compressor vanes, turbine blades, turbine vanes, fan blades, and fan vanes.

The splines for this type of fillet are typically defined by a start point that (tangent to surface, a specified distance from the adjacent surface) and end point (tangent to surface, a specified distance from adjacent surface) and tangent direction (tangent to surface) at each point, and a tension at each point that controls the curvature of the spline. The tangent direction on the airfoil is typically an isoparm of the airfoil 33 that is generally aligned with the radial direction of the airfoil 33. The tangent direction on the platform 31 is typically an intersection of the platform and a plane normal to the intersection of the airfoil 33 and platform 31. Additional points can be added on the spline if required. The curvature of the splines is designed to be greater than the minimum castable curvature. The number and position of the splines may be variable and is chosen to provide sufficient shape control to optimize stress and/or aero constraints and produce a smooth surface.

It will be appreciated that the description of the fillet 40 between the platform 31 and the airfoil 33 may be applied to the fillet 50 between the shroud 34 and the airfoil 33. That is, the fillet 50 may be made a plurality of fillet sections each having a shape defined by a spline and described herein above with reference to FIGS. 6-16. A spline fillet may be used between any airfoil of an aircraft engine such as, for instance, a turbine blade, a turbine vane, a compressor blade, a compressor vane, a fan blade, and a fan stator vane.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An airfoil for a gas turbine engine, comprising:
an airfoil body extending in a spanwise direction from an inner end to an outer end and extending in a chordwise direction from a leading edge to a trailing edge, the airfoil body having a pressure side and an opposed suction side;
a platform located at the inner end and/or the outer end of the airfoil body, the platform extending transversally to the airfoil body; and
a fillet at a junction between the airfoil body and the platform, the fillet extending all around the airfoil body the fillet having a radius distribution at a given chordwise location, the radius distribution of the fillet varying from the platform to the airfoil body in the spanwise direction, the radius distribution defining
a local minimum, the radius of the fillet at the given chordwise location increasing from the local minimum along the spanwise direction toward both of the airfoil and the platform, and
a local maximum offset from the local minimum along the spanwise direction, the radius decreasing from the local maximum along the spanwise direction toward both of the airfoil and the platform,
the radius of the fillet varying continuously between the airfoil body and the platform all around the airfoil body.

2. The airfoil of claim 1, wherein the fillet has fillet sections extending from a platform end at the platform to an airfoil end at the airfoil body, at least one of the fillet section having an inflection point at which a radius of the fillet is infinite.

3. The airfoil of claim 2, wherein the at least one of the fillet section is located on the suction side of the airfoil body.

4. The airfoil of claim 1, wherein the fillet has fillet sections extending from a platform end at the platform to an airfoil end at the airfoil body, each of the fillet sections having a length extending from the platform end to the airfoil end along the fillet, the length of the fillet sections varying around the airfoil body.

5. The airfoil of claim 4, wherein the length is maximal on the suction side of the airfoil body.

6. The airfoil of claim 4, wherein, where the length of the fillet is maximal, a ratio of a first distance along the spanwise direction between the airfoil end and the platform to a second distance along a direction transverse to the chordwise direction between the airfoil body and the platform end is greater than 1.

7. The airfoil of claim 1, comprising a second local minimum, the radius of the fillet at the given chordwise location increasing from the second local minimum along the spanwise direction toward both of the airfoil and the platform, the local maximum located between the local minimum and the second local minimum.

8. The airfoil of claim 1, wherein the local minimum is located closer to the platform than the local maximum.

9. The airfoil of claim 1, wherein the local maximum is located closer to the platform than the local minimum.

10. The airfoil of claim 9, wherein the given chordwise location is located on the suction side of the airfoil body.

11. The airfoil of claim 1, wherein the radius distribution has a start fillet radius at the platform and an end fillet radius at the airfoil body, a difference between the start fillet radius and one of the local minimum and the local maximum different than a difference between the end fillet radius and the other of the local minimum and the local maximum.

12. The airfoil of claim 1, wherein the airfoil is a turbine blade.

13. The airfoil of claim 1, comprising a shroud at the outer end of the airfoil body, an outer fillet at a junction between the airfoil body and the shroud, an outer radius distribution of a fillet section of the outer fillet defining at least two local extrema located on the fillet and offset from both of the airfoil and the platform.

14. An airfoil for a gas turbine engine, comprising:
an airfoil body extending in a spanwise direction from a first end to a second end and extending in a chordwise direction from a leading edge to a trailing edge, the airfoil body having a pressure side and an opposed suction side;
a wall at the first end of the airfoil body, the wall extending transversally to the airfoil body; and
a fillet at a junction between the airfoil body and the wall, the fillet extending all around the airfoil body, at a given chordwise location, the fillet defining a convex portion and a concave portion, the radius of the fillet varying continuously between the airfoil body and the platform all around the airfoil body.

15. The airfoil of claim 14, wherein the concave portion is located closer to the platform than the convex portion.

16. The airfoil of claim 15, wherein the fillet defines an inflection point at an intersection between the concave portion and the convex portion.

17. The airfoil of claim 16, wherein the fillet extends away from the airfoil body from the inflection point toward the platform.

18. The airfoil of claim 16, wherein the convex portion and the concave portion are defined on one of the suction side and the pressure side of the airfoil body, the fillet extending toward the other of the suction side and the pressure side of the airfoil body from the inflection point to define an undercut in the airfoil body.

19. The airfoil of claim 14, wherein the fillet has fillet sections extending from a platform end at the platform to an airfoil end at the airfoil body, each of the fillet sections having a length extending from the platform end to the airfoil end along the fillet, the length of the fillet sections varying around the airfoil body.

20. A method of manufacturing a blade for a gas turbine engine, the method comprising:

providing an airfoil body with at least one end thereof joined to a platform; and forming a spline fillet between said at least one end of the airfoil body and the platform, the spline fillet extending all around the airfoil body, the spline fillet having a radius distribution at a determined chordwise location, the radius distribution including a first radius of the fillet and a second radius of the fillet, the first radius being a local minimum radius, the second radius being a local maximum radius, a radius of the fillet continuously increasing from the local minimum along a spanwise direction toward both of the airfoil and the platform, the radius continuously decreasing from the local maximum along the spanwise direction toward both of the airfoil and the platform, the radius of the spline fillet varying continuously between the airfoil body and the platform all around the airfoil body.

* * * * *